(12) United States Patent
Kato

(10) Patent No.: US 6,440,203 B2
(45) Date of Patent: Aug. 27, 2002

(54) INK COMPOSITION CAPABLE OF REALIZING IMAGES POSSESSING EXCELLENT COLOR DEVELOPMENT AND FIXATION

(75) Inventor: Shinichi Kato, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 70 days.

(21) Appl. No.: 09/759,189

(22) Filed: Jan. 8, 2001

(30) Foreign Application Priority Data

Jan. 6, 2000 (JP) ........................... 2000-000745

(51) Int. Cl.$^7$ ............................................. C09D 11/02
(52) U.S. Cl. ................ 106/31.6; 106/31.65; 106/31.86; 106/31.89
(58) Field of Search ............................ 106/31.6, 31.65, 106/31.86, 31.89

(56) References Cited

U.S. PATENT DOCUMENTS

| | | | | |
|---|---|---|---|---|
| 5,609,671 A | | 3/1997 | Nagasawa | ................. 106/31.6 |
| 5,630,868 A | * | 5/1997 | Belmont et al. | ......... 106/31.28 |
| 5,734,403 A | | 3/1998 | Suga | .......................... 347/101 |
| 5,746,818 A | * | 5/1998 | Yatake | ..................... 106/31.28 |
| 5,835,116 A | * | 11/1998 | Sato et al. | ................ 106/31.43 |
| 5,985,015 A | * | 11/1999 | Kanaya | ...................... 106/31.6 |
| 2002/0009547 A1 | * | 1/2002 | Ito et al. | ..................... 427/337 |
| 2002/0038613 A1 | * | 4/2002 | Yatake | ...................... 106/31.6 |

FOREIGN PATENT DOCUMENTS

| | | | |
|---|---|---|---|
| EP | 0879857 | 11/1998 | |
| JP | 6(1994)-106735 | 4/1994 | ............. B41J/2/21 |
| JP | 8(1996)-3498 | 1/1996 | ........... C09D/11/00 |
| WO | 9004005 | 4/1990 | |

* cited by examiner

Primary Examiner—Helene Klemanski
(74) Attorney, Agent, or Firm—Ladas & Parry

(57) ABSTRACT

An ink composition is provided which, when printed on recording media, can exhibit excellent color development and fixation, can be stably ejected, and can realize good images. This ink composition comprises a first colorant, a second colorant, a penetrating agent, water, and a water-soluble organic solvent. The first colorant is a pigment which is dispersible and/or dissolvable in water without any dispersant, and the second colorant is a pigment dispersion comprising a pigment and a dispersant for dispersing the pigment.

20 Claims, No Drawings

INK COMPOSITION CAPABLE OF REALIZING IMAGES POSSESSING EXCELLENT COLOR DEVELOPMENT AND FIXATION

BACKGROUND OF THE INVENTION

1. Field of the Invention

The present invention relates to an ink composition which can yield high-quality printed images on recording media.

2. Background Art

Ink jet recording is a recording method wherein droplets of ink are ejected through fine nozzles to form letters or figures on the surface of recording media. Various properties are required of inks used in such ink jet recording, and examples thereof include good dispersion stability, ejection stability, and rubbing/scratch resistance of prints.

Inks comprising various water-soluble dyes dissolved in aqueous media have generally been used. Further, inks comprising pigments dispersed in aqueous media have also been provided. Inks comprising pigments dispersed in aqueous media are advantageously superior to inks using water-soluble dyes in waterfastness and lightfastness of printed images.

Inks for ink jet recording are required to satisfy property requirements such that, for example, properties remain unchanged during storage for a long period of time, the ink does not clog fine nozzles, prints have high density and high sharpness, and prints yielded by the inks have good storage stability, for example, in terms of waterfastness and lightfastness. In particular, in the case of pigment-based inks, storage stability (that is, stable dispersion of the pigment for a long period of time) and freedom from nozzle clogging during printing or at the time of re-starting after interruption of printing are required.

On the other hand, a method has been proposed wherein the penetration of an ink composition is enhanced to shorten the drying time of printed images and, in addition, to form large pixels (for example, dots) using a small amount of ink. For example, the use of a color ink containing a surfactant or a solvent capable of penetrating recording media and a salt, which can impart a capability of penetrating recording media to ink, has been proposed (Japanese Patent Laid-Open No. 106735/1994).

The penetrating pigment-based ink is advantageous in that the ink component can effectively penetrate recording media, but on the other hand, in some cases, the color development is somewhat poor when this ink is printed on plain paper. Enhancing the content of the pigment in the ink is considered effective for improving the color development. Enhancing the content of the pigment, however, often enhances the viscosity of ink, and thus is often unfavorable for the ejection stability of ink. Ink using a self-dispersible pigment can prevent an increase in viscosity even when the content of the pigment in the ink is increased. Further, this ink has excellent color development. In some cases, however, this ink is somewhat poor in fixation on recording media. The addition of a resin emulsion or a water-soluble resin has been proposed as means for improving the fixation of ink. In general, however, the addition of the resin emulsion or the water-soluble resin is likely to enhance the viscosity of the ink.

SUMMARY OF THE INVENTION

The present inventors have now found that an ink composition containing a first colorant and a second colorant can realize good printed images. The present inventors have particularly found that this ink composition, when used in an ink jet recording method, can exhibit excellent color development, can be stably ejected, does not cause nozzle clogging, can realize stable printing, and can realize images having excellent fixation. The present invention has been made based on such finding.

Accordingly, it is an object of the present invention to provide an ink composition which can realize good images, especially an ink composition which, when used in an ink jet recording method, exhibits excellent color development and fixation and can realize good image quality.

According to a first aspect of the present invention, there is provided an ink composition comprising: a first colorant; a second colorant; a penetrating agent; water; and a water-soluble organic solvent, said first colorant being a pigment which is dispersible and/or dissolvable in water without any dispersant, said second colorant being a pigment dispersion comprising a pigment and a dispersant for dispersing the pigment.

DESCRIPTION OF THE PREFERRED EMBODIMENTS

Ink Composition

The ink composition according to the present invention is used in recording methods using ink compositions, for example, ink jet recording, recording method using writing utensils, such as pens, and other various printing methods. Particularly preferably, the ink composition according to the present invention is used in the ink jet recording method.

The ink composition according to the present invention comprises a first colorant, a second colorant, a penetrating agent, water, and a water-soluble organic solvent.

First Colorant

According to the present invention, the first colorant is a pigment which has been rendered dispersible and/or dissolvable in water without any dispersant, and is generally called "self-dispersible pigment." This pigment has been rendered dispersible and/or dissolvable in water without any dispersant by treating a pigment on its surface so as to bond at least one functional group selected from the group consisting of carbonyl, carboxyl, hydroxyl, and sulfone groups, or a salt thereof, onto the surface of the pigment. More specifically, this surface-treated pigment may be prepared by grafting a functional group or a molecule containing a functional group onto the surface of carbon black by physical treatment, such as vacuum plasma, or chemical treatment (for example, oxidation with hypochlorous acid, sulfonic acid or the like). According to the present invention, a single type or a plurality of types of functional groups may be grafted on one carbon black particle. The type and the degree of grafting of the functional group(s) may be properly determined by taking into consideration, for example, dispersion stability in ink, color density, and drying properties at the front end of an ink jet head.

In the present invention, when the pigment is stably present in water without any dispersant, this state is expressed as the state of "dispersion and/or dissolution." Not infrequently, it is difficult to clearly distinguish the state of dissolution of a material from the state of dispersion of the material. In the present invention, any pigment can be used so far as the pigment can stably exist in water without any dispersant, independently of whether the pigment is in a dispersion form or a solution form. Therefore, in the present specification, a pigment, which can stably exist in water without any dispersant, is sometimes referred to as a "first colorant." The pigment in this case, however, does not exclude a pigment which is in the state of dispersion.

Preferred pigments usable in the present invention may be produced, for example, by a method described in Japanese Patent Laid-Open No. 3498/1996. Carbon black treated by the method described in this publication has a high surface active hydrogen content of 1.5 to 2.5 mmol/g. As a result, the dispersibility of the treated carbon black in water is very high. Commercially available products may also be used as the above pigment, and preferred examples thereof include Microjet CW 1 manufactured by Orient Chemical Industries, Ltd.

For the pigment used in the first colorant, inorganic and organic pigments may be used without particular limitation so far as, as described above, they can be rendered dispersible and/or dissolvable in water without the aid of any dispersant. Inorganic pigments usable herein include, in addition to titanium oxide and iron oxide, carbon blacks produced by known processes, such as contact, furnace, and thermal processes. Organic pigments usable herein include azo pigments (including azo lakes, insoluble azo pigments, condensed azo pigments, and chelate azo pigments), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline black.

Specific examples of such pigments are as follows. Carbon blacks usable for black inks include: carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Columbian Carbon Co., Ltd., for example, Raven 5750, 5250, 5000, 3500, 1255, and 700; carbon blacks manufactured by Cabot Corporation, for example, Regal 400 R, 330 R, 660 R, Mogul L, Monarch 700, 800, 880, 900, 1000, 1100, 1300, and 1400; and carbon blacks manufactured by Degussa, for example, Color Black FW 1, FW 2, FW 2 V, FW 18, FW 200, S 150, S 160, S 170, Printex 35, U, V, 140 U, Special Black 6, 5, 4A, and 4.

Pigments for yellow inks include C.I. Pigment Yellow 1, 2, 3, 12, 13, 14, 16, 17, 73, 74, 75, 83, 93, 95, 97, 98, 109, 110, 114, 128, 129, 138, 150, 151, 154, 155, 180, and 185.

Pigments for magenta inks include C.I. Pigment Red 5, 7, 12, 48 (Ca), 48 (Mn), 57 (Ca), 57:1, 112, 122, 123, 168, 184, and 202.

Pigments for cyan inks include C.I. Pigment Blue 1, 2, 3, 15:3, 15:4, 16, 22, 60, C.I. Vat Blue 4, and 60.

According to a preferred embodiment of the present invention, the average particle diameter of the pigment is approximately in the range of 1 to 300 nm, more preferably approximately in the range of 10 to 200 nm. The content of the pigment in the first colorant is in the range of 0.1 to 10% by weight, preferably in the range of 0.2 to 8% by weight, based on the ink composition.

Second Colorant

The ink composition according to the present invention contains a second colorant. In the ink composition according to the present invention, the addition of the first colorant and the second colorant can significantly improve the color development and the fixation.

The second colorant is a pigment dispersion comprising a pigment and a dispersant for dispersing the pigment. For the pigment contained in the second colorant, inorganic and organic pigments may be used without particular limitation so far as, as described above, they can be dispersed with the aid of a dispersant. Inorganic pigments usable herein include, in addition to titanium oxide and iron oxide, carbon blacks produced by known processes, such as contact, furnace, and thermal processes. Organic pigments usable herein include azo pigments (including azo lakes, insoluble azo pigments, condensed azo pigments, and chelate azo pigments), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline black.

Specific examples of such pigments are as follows. Carbon blacks usable for black inks include: carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Columbian Carbon Co., Ltd., for example, Raven 5750, 5250, 5000,3500, 1255, and 700; carbon blacks manufactured by Cabot Corporation, for example, Regal 400 R, 330 R, 660 R, Mogul L, Monarch 700, 800, 880, 900, 1000, 1100, 1300, and 1400; and carbon blacks manufactured by Degussa, for example, Color Black FW 1, FW 2, FW 2 V, FW 18, FW 200, S 150, S 160, S 170, Printex 35, U, V, 140 U, Special Black 6, 5, 4A, and 4.

Pigments for yellow inks include C.I. Pigment Yellow 1, 2, 3, 12, 13, 14, 16, 17, 73, 74, 75, 83, 93, 95, 97, 98, 109, 110, 114, 128, 129, 138, 150, 151, 154, 155, 180, and 185.

Pigments for magenta inks include C.I. Pigment Red 5, 7, 12, 48 (Ca), 48 (Mn), 57 (Ca), 57:1, 112, 122, 123, 168, 184, and 202.

Pigments for cyan inks include C.I. Pigment Blue 1, 2, 3, 15:3, 15:4, 16, 22, 60, C.I. Vat Blue 4, and 60.

According to a preferred embodiment of the present invention, the average particle diameter of the pigment is approximately in the range of 1 to 300 nm, more preferably approximately in the range of 10 to 200 nm.

According to a preferred embodiment of the present invention, the ink composition contains the first and second colorants so that the weight ratio of the first colorant to the pigment contained in the second colorant in the ink composition is in the range of 1:3 to 7:1, preferably in the range of 1:1 to 3:1.

According to a preferred embodiment of the present invention, the total amount of the first colorant and the pigment contained in the second colorant is preferably not more than 20% by weight, more preferably not more than 15% by weight, based on the ink composition.

Dispersants used in the preparation of pigment dispersions, for example, polymeric dispersants or surfactants, may be used as the dispersant used in the second colorant.

Examples of preferred polymeric dispersants include naturally occurring polymeric compounds, and specific examples thereof include: proteins, such as glue, gelatin, casein, and albumin; naturally occurring rubbers, such as gum arabic and tragacanth; glucosides, suchassaponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxyethylcellulose.

Examples of additional preferred polymeric dispersants include synthetic polymers, and examples thereof include: polyvinyl alcohols; polyvinyl pyrrolidones; acrylic resins, such as polyacrylic acid, acrylic acid/acrylonitrile copolymer, potassium acrylate/acrylonitrile copolymer, vinyl acetate/acrylic ester copolymer, and acrylic acid/alkyl acrylate copolymer; styrene/acrylic acid resins, such as styrene/acrylic acid copolymer, styrene/methacrylic acid copolymer, styrene/methacrylic acid/alkyl acrylate copolymer, styrene/α-methylstyrene/acrylic acid copolymer, and styrene/α-methylstyrene/acrylic acid/alkyl acrylate copolymer; styrene/maleic acid copolymer; styrene/maleic anhydride copolymer; vinylnaphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer; and salts of the above polymers. Among them, a copolymer of a monomer having a hydrophobic group with a monomer having a hydrophilic group and a polymer of a monomer having both a hydrophobic group and a hydrophilic group are particularly preferred. Examples of the salt referred to above include salts, for example, with diethylamine, ammonia, ethylamine, triethylamine, propylamine, isopropylamine, dipropylamine, butylamine, isobutylamine, triethanolamine, diethanolamine, aminomethyl propanol, or morpholine. For these copolymers, the weight average molecular weight is preferably 3,000 to 30,000, more preferably 5,000 to 15,000.

Examples of preferred surfactants as the dispersant include: anionic surfactants, such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants, such as fatty acid amine salts, quaternary ammonium salts, sulfonium salts, and phosphoniums; and nonionic surfactants, such as polyoxyethylene alkyl ethers, polyoxyethylene alkyl esters, sorbitan alkyl esters, and polyoxyethylene sorbitan alkyl esters. A person having ordinary skill in the art would appreciate that these surfactants, when added to the ink composition, function also as a surfactant.

According to a preferred embodiment of the present invention, the dispersant is a water-soluble resin derived from acrylic acid. The water-soluble resin derived from acrylic acid referred to herein is a resin comprising acrylic acid as a component, preferably a resin composed mainly of acrylic acid.

Specific examples of preferred water-soluble resins derived from acrylic acid include acrylic acid copolymers, methacrylic acid copolymers, acrylic acid-maleic acid copolymers, acrylic acid-methacrylic acid copolymers, acrylic acid-methacrylic acid-ethyl acrylate copolymers, acrylic acid-methacrylic acid-acrylonitrile copolymers, acrylic acid-n-butyl methacrylate copolymers, acrylic acid-methyl methacrylate copolymers, alkyl acrylate polymers, alkyl acrylate-acrylamide copolymers, alkyl acrylate-acrylic acid copolymers, alkyl acrylate-acrylic acid-alkylacrylamide copolymers, alkyl acrylate-acrylic acid-itaconic acid copolymers, alkyl acrylate-acrylic acid-alkyl itaconate copolymers, alkyl acrylate-acrylic acid-3-butene-2,3-tricarboxylic acid copolymers, alkyl acrylate-hydroxyalkyl acrylate copolymers, alkyl acrylate-itaconic acid copolymers, alkyl acrylate-ethylene glycol dimethacrylate copolymers, alkyl acrylate-vinyl chloroacetate copolymers, alkyl acrylate-diacetoneacrylamide copolymers, alkyl acrylate-divinylbenzene copolymers, alkyl acrylate-vinylpyridine copolymers, alkyl acrylate-alkyl maleate copolymers, alkyl acrylate-methacrylic acid copolymers, alkyl acrylate-methacrylic acid-diallyl phthalate copolymers, ethyl acrylate-methyl methacrylate-dimethylaminoethyl methacrylate copolymers, ethyl acrylate-glycidyl methacrylate-acrylamide-styrene copolymers, octyl acrylate-methyl methacrylate-triphenyl itaconate copolymers, octyl acrylate-methyl methacrylate-triphenyl methacrylate copolymers, octyl acrylate-methyl methacrylate-triphenyl maleate copolymers, tribromophenyl acrylate polymers, tribromophenyl acrylate-chlorostyrene copolymers, and salts of these polymers (for example, lithium, sodium, potassium, calcium, magnesium, aluminum, and other metal salts). One of or two or more resins selected from the above resins may be used. These resins may be produced by a method commonly used in the art. Alternatively, commercially available resins may be used. These resins are not limited to the form of copolymerization, and may be, for example, a block copolymer, a graft copolymer, a random copolymer, or a mixture of these (co)polymers.

A specific example of the block copolymer is an AB or BAB block copolymer disclosed in Japanese Patent Laid-Open No. 227668/1992 which is preferably used also in the present invention.

Units constituting the AB or BAB block copolymer will be described.

The unit A is a hydrophobic homopolymer or copolymer of an acrylic monomer represented by formula $CH_2=C(X)(Y)$.

In the above formula, X represents hydrogen or $CH_3$; Y represents $C(O)OR^1$, $C(O)NR^2R^3$, or CN wherein $R^1$ represents an alkyl group having 1 to 20 carbon atoms, an aryl group, or an alkyl aryl group; and $R^2$ and $R^3$ each independently represent hydrogen, an alkyl group having 1 to 9 carbon atoms, an aryl group, or an alkyl aryl group.

The unit A has an average molecular weight of at least 300, and is insoluble in water.

The unit B is a hydrophilic polymer or a salt thereof. The polymer may be the following polymer (1) or (2).

(1) A polymer comprising an acrylic monomer represented by formula $CH_2=C(X)(Y^1)$ wherein X represents hydrogen or $CH_3$; and $Y^1$ represents $C(O)OH$, $C(O)NR^2R^3$, $C(O)OR^4NR^2R^3$, or $C(O)OR^5$ wherein $R^2$ and $R^3$ each independently represent hydrogen, an alkyl group having 1 to 9 carbon atoms, an aryl group, or an alkyl aryl group, $R^4$ represents an alkyl radical having 1 to 5 carbon atoms, and $R^5$ represents an alkyl radical having 1 to 20 carbon atoms which optionally contains one or more hydroxyl or ether groups.

(2) A copolymer of an acrylic monomer represented by formula $CH_2=C(X)(Y^1)$, wherein X and $Y^1$ are as defined above in connection with the above polymer (1), with an acrylic monomer represented by $CH_2=C(X)(Y)$ wherein X and Y are as defined above in connection with the unit A.

The unit B has an average molecular weight of at least 300, and is soluble in water. About 10 to 90% by weight of the block copolymer is accounted for by the unit B.

The AB or BAB block copolymer is described in detail in Japanese Patent Laid-Open No. 227668/1992.

The water-soluble resin derived from acrylic acid according to the present invention preferably has a molecular weight of about 1,000 to 100,000, more preferably about 5,000 to 50,000.

A polymeric compound having an anionic group(s) is utilized for covering the pigment as a colorant to form an anionic microencapsulated pigment dispersion. The production process of polymeric compounds containing anionic groups and anionic microencapsulated pigment dispersions using the same is described, for example, in Japanese Patent Laid-Open No. 151342/1997. Specific examples of polymeric compounds containing anionic groups include materials having anionic groups, for example, polyvinyl compounds, such as polyvinyl chloride, polyvinyl acetate, polyvinyl alcohol, and polyvinyl butyral, polyester resins, such as alkyd resin and phthalic resin, amino materials, such as melamine resin, melamine-formaldehyde resin, amino alkyd co-condensation resin, and urea resin, thermoplastic, thermosetting, or modified acrylic, epoxy, polyurethane, polyether, polyamide, unsaturated polyester, phenolic, silicone, fluoro polymeric compounds, or copolymers of components constituting the above polymeric compounds or mixtures of the above polymeric compounds.

The anionic microencapsulated pigment dispersion is preferably produced by a salting-out method described in Japanese Patent Laid-Open No. 151342/1997. This method will be described below.

A water-containing cake is produced by a process which comprises the steps of: partially or entirely neutralizing anionic groups in a polymeric compound containing anionic groups with a basic compound and kneading the neutralized polymeric compound with a pigment in an aqueous medium; and rendering this kneaded product neutral or acidic (in terms of pH) by the addition of an acidic compound to precipitate and fix the polymeric compound having anionic groups to the pigment. A basic compound is added to this water-containing cake to partially or entirely neutralize the anionic groups. Thus, an anionic microencapsulated pigment dispersion is prepared.

Regarding the kneading method, the basic compound, the acidic compound, the neutralization method and the like, reference may be made to Japanese Patent Laid-Open No. 151342/1997. Further, also for curing agents and methods for curing a coating of the polymeric compound having anionic groups, reference may be made to this publication.

The amount of the polymeric dispersant, surfactant, or polymeric compound having anionic groups added is preferably in the range of 5 to 150% by weight, more preferably 10 to 120% by weight, based on the pigment.

Penetrating Agent

The ink composition according to the present invention contains a penetrating agent. Specific examples of preferred penetrating agents include glycol ethers and/or acetylene glycol surfactants.

Specific examples of glycol ethers usable in the present invention include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether. They may be used alone or as a mixture of two or more.

The amount of the glycol ether added is in the range of 1 to 20% by weight, preferably in the range of 2 to 15% by weight, based on the ink composition.

Specific examples of preferred acetylene glycol surfactants usable in the present invention include compounds represented by formula (I):

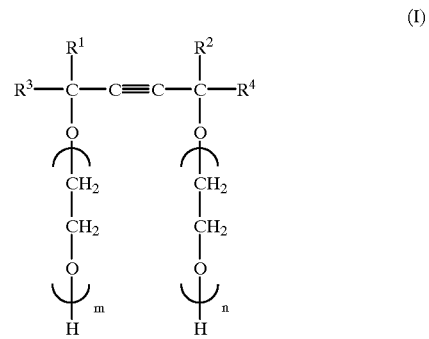

wherein $0 \leq m+n \leq 50$; and $R^1$, $R^2$, $R^3$, and $R^4$ each independently represent an alkyl group (preferably an alkyl group having 1 to 6 carbon atoms).

Among the compounds represented by formula (I), particularly preferred compounds include 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactant represented by the formula (I). Specific examples thereof include Surfynol 104, Surfynol 82, Surfynol 465, Surfynol 485, and Surfynol TG (all the above products being available from Air Products and Chemicals Inc.) and OLFINE STG and OLFINE E 1010 (tradenames: manufactured by Nissin Chemical Industry Co., Ltd.).

The amount of the surfactant added is preferably about 0.1 to 10% by weight, more preferably about 0.1 to 2% by weight, based on the ink composition.

The ink composition according to the present invention generally has a surface tension of about 25 to 50 mN/m, preferably about 30 to 40 mN/m.

Water, Water-Soluble Organic Solvent, and Other Optional Ingredients

In the ink composition according to the present invention, preferably, water and a water-soluble organic solvent are used to constitute an aqueous solvent. Water may be pure water obtained by ion exchange, ultrafiltration, reverse osmosis, distillation or the like, or ultrapure water. Further, water, which has been sterilized, for example, by ultraviolet irradiation or by addition of hydrogen peroxide, is suitable because, when the ink composition is stored for a long period of time, it can prevent the growth of mold or bacteria.

The water-soluble organic solvent is preferably a low-boiling organic solvent. Examples of low-boiling organic solvents usable herein include methanol, ethanol, n-propyl alcohol, iso-propyl alcohol, n-butanol, sec-butanol, tert-butanol, iso-butanol, and n-pentanol. Particularly preferred are monohydric alcohols. The low-boiling organic solvent has the effect of shortening the time required for drying ink. The amount of the low-boiling organic solvent added is preferably in the range of about 0.5 to 20% by weight, more preferably in the range of about 1 to 10% by weight, based on the ink composition.

According to a preferred embodiment of the present invention, the ink composition further contains a wetting agent comprising a high-boiling organic solvent. Examples of preferred high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether; urea; 2-pyrrolidone and N-methyl-2-pyrrolidone; and 1,3-dimethyl-2-imidazolidinone. They may be used alone or as a mixture of two or more. Among them, glycerin, triethylene glycol monobutyl ether, 2-pyrrolidone, ethylene glycol, diethylene glycol, triethylene glycol, polyethylene glycol, diethylene glycol monobutyl ether, and urea are preferred.

The amount of the wetting agent added is preferably in the range of about 1 to 40% by weight, more preferably in the range of about 2 to 30% by weight, based on the ink composition.

According to a preferred embodiment of the present invention, the ink composition may further contain saccharides. Specific examples of preferred saccharides include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, maltotriose, and xylitol. The polysaccharides refer to saccharides in a wide sense and embrace materials which widely exist in the natural world, such as alginic acid, α-cyclodextrin, and cellulose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbit.

The content of the saccharide is 1 to 20% by weight, preferably 3 to 10% by weight, based on the ink composition.

The ink composition according to the present invention may further comprise a surfactant. Examples of surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides), and acetylene glycols (OLFINE Y and Surfynol 82, 104, 440, 465, and 485) (all the above products being manufactured by Air Products and Chemicals Inc.). They may be used alone or in combination of two or more.

The ink composition according to the present invention may further contain preservatives or antimolds, pH adjustors, solubilizers, antioxidants, ultraviolet absorbers, nozzle clogging preventives, electric conductivity adjustors, viscosity modifiers, surface tension modifiers, oxygen absorbers, etc.

Examples of preservatives or antimolds include sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI).

Examples of pH adjustors, solubilizers, or antioxidants include: amines, such as diethanolamine, triethanolamine, propanolamine, and morpholine, and modification products thereof; inorganic salts, such as potassium hydroxide, sodium hydroxide, and lithiumhydroxide; ammoniumhydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof.

The ink composition according to the present invention may contain an additional antioxidant and an ultraviolet absorber, and examples thereof include Tinuvin 328, 900, 1130, 384, 292, 123, 144, 622, 770, and 292, Irgacor 252 and 153, and Irganox 1010, 1076, 1035, and MD 1024, manufactured by Ciba-Geigy; and lanthanide oxides.

Production Process of Ink Composition

The ink composition according to the present invention may be prepared by dispersing and mixing the above ingredients together by means of a suitable method. The first and second colorants are prepared, and are mixed with an aqueous solvent and other ingredients together by means of a suitable dispergator (for example, a ball mill, a sand mill, an attritor, a roll mill, an agitator mill, a Henschel mixer, a colloid mill, an ultrasonic homogenizer, a jet mill, or an angmill) to prepare a homogeneous pigment dispersion. Subsequently, water, a water-soluble organic solvent, a saccharide, a pH adjustor, a preservative, an antimold and the like are added to and satisfactorily dissolved in the pigment dispersion to prepare an ink solution. After thorough stirring, the ink solution is filtered to remove coarse particles and foreign matter causative of nozzle clogging to obtain a contemplated ink composition. According to the present invention, preferably, the water-soluble resin derived from acrylic resin and the pigment are first homogeneously dispersed in each other by means of a dispergator, to prepare a second colorant, a first colorant is added to the second colorant, the mixture is further dispersed, and the water-soluble organic solvent and other optional ingredients are then added to the dispersion, followed by mixing to prepare a contemplated ink composition.

Ink Set

Ink compositions according to the present invention include black ink compositions, cyan ink compositions, magenta ink compositions, and yellow ink compositions. Thus, according to another aspect of the present invention, there is provided an ink set comprising two or more of the ink composition according to the present invention. Additionally, according to another aspect of the present invention, there is provided an ink set comprising the ink composition according to the present invention and other ink composition(s). For other ink compositions, the colorant and other ingredients may be properly determined by taking into consideration the printing method used. Printing using a combination of these ink compositions can realize images having excellent color development and fixation. The ink set according to the present invention is preferably used in an ink jet recording method.

According to another preferred embodiment of the present invention, there is provided an ink set comprising a first ink composition and a second ink composition, wherein both the first and second ink compositions are ink compositions according to the present invention, and when the first ink composition and the second ink composition are printed on a recording medium under identical printing conditions, the OD value of a print produced by printing the first ink composition on the recording medium is higher than the OD value of a print produced by printing the second ink composition on the recording medium.

According to another preferred embodiment of the present invention, there is provided an ink set comprising a first ink composition and a second ink composition, wherein, when the content of the colorant in the first ink composition is larger than the content of the colorant in the second ink composition, the weight ratio of the first colorant to the pigment contained in the second colorant in the first ink composition is 1 exclusive: 1 to 3:1 while the weight ratio of the first colorant to the pigment contained in the second colorant in the second ink composition is 1:1 exclusive to 1:3. According to a more preferred embodiment of the present invention, in this ink set, both the first and second ink compositions are ink compositions according to the present invention. More preferably, the pigment contained in the first ink composition is identical to the pigment contained in the second ink composition.

According to another preferred embodiment of the present invention, in the ink set comprising the first and second ink compositions, the first ink composition is a yellow ink composition, a magenta ink composition, or a cyan ink composition, while the second ink composition is a light yellow ink composition, a light magenta ink composition, or a light cyan ink composition.

EXAMPLES

The present invention will be described in more detail with reference to the following examples, though it is not limited to these examples only. In tables, numeric values are in % by weight.

Preparation of Ink Compositions

Ink compositions having formulations shown in Tables 1 and 2 were prepared as follows.

The first colorant and the second colorant were mixed together to prepare a pigment dispersion. Separately, the penetrating agent and other water-soluble organic solvent, and other optional ingredients were mixed together to prepare an ink solvent. This ink solvent was gradually added dropwise to the pigment dispersion with stirring, and the mixture was stirred at room temperature for 20 min. The mixture was then filtered through a 5-$\mu$m membrane filter to prepare an ink composition.

In Table 2, "Y" represents a yellow ink, "M" a magenta ink, "C" a cyan ink, and "LC" a light cyan ink. Further, in inks of Examples 5 to 9 in Table 2, the pigment in the first colorant and the pigment in the second colorant were identical to each other (In Example 9, C.I. Pigment Blue 15:3 was used). In ink of Example 10, the first colorant was C.I. Pigment Blue 15:3, and the pigment contained in the second colorant was C.I. Pigment Blue 15:4.

Preparation of First Colorant

In the ink compositions described above, the first colorant was prepared as follows.

Black Ink

An acidic carbon black (100 g) having a primary particle diameter of 24 nm and a specific surface area of 137 $cm^2/g$ was mixed with 500 g of water. The mixture was ball milled using zirconia beads. Sodium hypochlorite (available chlorine content 12%) (1,500 g) was added dropwise to the resultant milled stock liquid, and the mixture was boiled for 10 hr to conduct wet oxidation. The resultant stock dispersion was filtered through a glass fiber filter paper GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare a black pigment dispersion.

Yellow Ink (1) Step of Surface Treatment

A condensed azo pigment (C.I. Pigment Yellow 128) (15 parts by weight) was mixed with 450 parts by weight of quinoline. Dispersion and particle size regulation were carried out by means of Eiger Motor Mill (model M250, manufactured by Eiger Japan) under conditions of percentage beads packing 70% and rotation speed 5,000 rpm for 2 hr. A mixture of the pigment paste, subjected to dispersion and particle size regulation, with a solvent was transferred to an evaporator, and heated to 120° C. while reducing the pressure to not more than 30 mmHg to distil away water contained in the system as much as possible. Thereafter, the temperature of the system was regulated to 160° C., 20 parts by weight of a sulfonated pyridine complex was added thereto, and a reaction was allowed to proceed for 8 hr. After the completion of the reaction, the reaction product was washed several times with an excess of quinoline, and then poured into water, followed by filtration through a Buchner funnel to prepare surface treated yellow pigment particles.

(2) Step of Dispersion

To 15 parts by weight of the surface treated yellow pigment were added 2 parts by weight of 2-amino-2-methyl-1-propanol as a neutralizing agent, and 62 parts by weight of ion-exchanged water. The mixture was dispersed in a paint shaker (glass beads used; percentage beads packing=60%; media diameter=1.7 mm) until the average particle diameter (secondary particle diameter) of the yellow pigment was brought to 110 nm. Thus, a surface treated yellow pigment dispersion was prepared.

Magenta Ink (1) Step of Surface Treatment

A dimethylquinacridone pigment (C.I. Pigment Red 122) (20 parts by weight) was mixed with 500 parts by weight of quinoline. Dispersion and particle size regulation were carried out by means of Eiger Motor Mill (model M250, manufactured by Eiger Japan) under conditions of percentage beads packing 70% and rotation speed 5,000 rpm for 2 hr. A mixture of the pigment paste, subjected to dispersion and particle size regulation, with a solvent was transferred to an evaporator, and heated to 120° C. while reducing the pressure to not more than 30 mmHg to distil away water contained in the system as much as possible. Thereafter, the temperature of the system was regulated to 160° C., 20 parts by weight of a sulfonated pyridine complex was added thereto, and a reaction was allowed to proceed for 4 hr. After the completion of the reaction, the reaction product was washed several times with an excess of quinoline, and then poured into water, followed by filtration through a Buchner funnel to prepare surface treated magenta pigment particles.

(2) Step of Dispersion

To 15 parts by weight of the surface treated magenta pigment particles were added 5 parts by weight of an aqueous sodium hydroxide solution (10%) as a neutralizing agent and 80 parts by weight of ion-exchanged water. The mixture was dispersed in a paint shaker (glass beads used; percentage beads packing=60%; media diameter=1.7 mm)

until the average particle diameter (secondary particle diameter) of the surface treated magenta pigment was brought to 100 nm. Thus, a surface treated magenta pigment dispersion was prepared.

Cyan Ink 1

A surface treated cyan pigment dispersion was prepared in the same manner as described above in connection with the preparation of the yellow ink, except that a phthalocyanine pigment (C.I. Pigment Blue 15:3) was used instead of the condensed azo pigment (C.I. Pigment Yellow 128).

Cyan Ink 2

A surface treated cyan pigment dispersion was prepared in the same manner as described above in connection with the preparation of the yellow ink, except that a phthalocyanine pigment (C.I. Pigment Blue 15:4) was used instead of the condensed azo pigment (C.I. Pigment Yellow 128).

Second Colorant

The same pigment as used in the first colorant, an acrylic acid-acrylamide copolymer (molecular weight 7,000; tradename Joncryl J-679), and ion-exchanged water, together with glass beads (diameter: 1.7 mm, amount: 1.5 times (by weight) larger than the mixture), were mixed together and dispersed for 2 hr in a sand mill (manufactured by Yasukawa Seisakusho) to prepare a pigment dispersion containing a second colorant. In Table 1, "C.B." represents carbon black. In Tables 1 and 2, "Resin" represents the above copolymer.

Evaluation Tests on Ink Composition

The ink compositions prepared in the above examples and comparative examples were printed on the following papers for evaluation by means of an ink jet printer MJ-8000C (manufactured by Seiko Epson Corp.) to evaluate the ink compositions. The printing was carried out under conditions of an amount of ink ejected of 0.025 µg/dot and a density of 720 dpi. The unit "duty" used herein refers to a unit of a value D defined and calculated by equation (I):

$$D = \frac{\text{number of actually printed dots}}{\text{longitudianl resolution} \times \text{transverse resolution}} \times 100 \text{ (duty)} \quad (I)$$

Papers Used for Evaluation (1) Xerox P (Xerox Corp.)
(2) Ricopy 6200 (Ricoh Co., Ltd.)
(3) Xerox 4024 3R 721 (Xerox Corp.)
(4) Neenah Bond (Kimberly-Clark)
(5) Xerox R (Xerox Corp.)
(6) Yamayuri (Honshu Paper Co., Ltd.)

Evaluation 1: OD Value

Blotted images (100% duty) were printed on 6 papers for evaluation, and were measured for optical density (OD value) of the blotted images. The average value of the OD values for the six papers was determined. The average value was evaluated according to the following criteria. The results were as shown in Tables 3 and 4 below. In the determination of the OD value, the reflection density was measured with Macbeth TR-927 (manufactured by Macbeth). The black inks were evaluated according to evaluation 1, and the color inks were evaluated according to evaluation 2.

Evaluation 1—1 (Black Inks)

A: Average OD value of not less than 1.3
B: Average OD value of not less than 1.2 to less than 1.3
C: Average OD value of not less than 1.1 to less than 1.2
D: Average OD value of less than 1.1

Evaluation 1–2 (Color Inks)

A: Average OD value of not less than 1.2
B: Average OD value of not less than 1.1 to less than 1.2

TABLE 1

| Ink composition | Ex. | | | | Comp. Ex. | |
|---|---|---|---|---|---|---|
| | 1 | 2 | 3 | 4 | 1 | 2 |
| 1st colorant | 2 | 7 | 4 | 6 | 0 | 8 |
| 2nd colorant C.B. | 6 | 1 | 4 | 2 | 8 | 0 |
| 2nd colorant Resin | 2.6 | 0.4 | 1.7 | 0.9 | 3.4 | 0 |
| Glycerin | 13 | 13 | 13 | 13 | 13 | 13 |
| 2-Pyrrolidone | 2 | 2 | 2 | 2 | 2 | 2 |
| Triethyleneglycol mono-butyl ether | 7 | 7 | 7 | 7 | 7 | 7 |
| Olfine E 1010 | 1 | 1 | 1 | 1 | 1 | 1 |
| Proxel XL 2 | 0.3 | 0.3 | 0.3 | 0.3 | 0.3 | 0.3 |
| Ion-exchanged water | Balance | Balance | Balance | Balance | Balance | Balance |

TABLE 2

| Ink composition | Ex. | | | | | |
|---|---|---|---|---|---|---|
| | 5(Y) | 6(M) | 7(LM) | 8(C) | 9(LC) | 10(LC) |
| 1st colorant (pigment) | 4 | 4 | 0.7 | 6 | 0.5 | 0.5 |
| 2nd colorant (pigment) | 2 | 3 | 1.4 | 2 | 1.5 | 1.5 |
| (resin) | 0.9 | 1.3 | 0.6 | 0.9 | 0.6 | 0.6 |
| Glycerin | 11 | 10 | 16 | 12 | 17 | 17 |
| 2-Pyrrolidone | 2 | 2 | 4 | 2 | 4 | 4 |
| Triethylene glycol monobutyl ether | 5 | 5 | 5 | 10 | 7 | 7 |
| Olfine E 1010 | 1 | 1 | 1 | 1 | 1 | 1 |
| Proxel XL 2 | 0.3 | 0.3 | 0.3 | 0.3 | 0.3 | 0.3 |
| Ion-exchanged water | Balance | Balance | Balance | Balance | Balance | Balance |

C: Average OD value of not less than 1.0 to less than 1.1

D: Average OD value of less than 1.0

Evaluation 2: Rubbing/scratch Resistance

Characters were continuously printed on six papers for evaluation. The printed characters were then rubbed with a water-base yellow fluorescent marker pen (ZEBRA PEN (trademark)) manufactured by ZEBRA at a marking force of $4.9 \times 10^5$ N/m$^2$, and were then visually inspected for stain. The results were evaluated according to the following criteria, and are shown in Tables 3 and 4 below.

A: Rubbing twice immediately after the printing caused no stain.

B: Rubbing twice 24 hr after air drying caused no stain.

C: For some of the papers, rubbing twice 24 hr after air drying caused stain although rubbing once 24 hr after air drying caused no stain.

D: For some of the papers, rubbing once 24 hr after air drying caused stain.

Evaluation 3: Anti-Clogging Property

The ink was loaded into an ink jet printer MJ-8000C, and printing was continuously carried out for 10 min. Thereafter, the printer was stopped, and allowed to stand for one week without capping of the head under an environment of an atmosphere temperature of 40° C. and a relative humidity of 25%. After the standing period, cleaning operations of nozzles were carried out, followed by re-start of the printing. In this case, the number of cleaning operations necessary for printing free from blurring or dropouts of dots to be provided, that is, for print quality equal to that before the standing to be obtained, was determined. The results were evaluated according to the following criteria, and are shown in Tables 3 and 4 below.

A: Print quality equal to the initial print quality could be obtained after 0 to 5 cleaning operations.

B: Print quality equal to the initial print quality could be obtained after 6 to 10 cleaning operations.

C: Print quality equal to the initial print quality could be obtained after 11 or more cleaning operations.

D: Print quality equal to the initial print quality could not be obtained even after 11 or more cleaning operations.

Evaluation 4: Viscosity

The viscosity of the ink at 20° C. was measured with a vibration-type viscometer (manufactured by Yamaichi Electric Mfg. Co., Ltd.), and was evaluated according to the following criteria. The results are shown in Tables 3 and 4 below.

A: Not less than 3 mPa.s to less than 7 mPa.s

B: Not less than 7 mPa.s to less than 10 mPa.s

C: Not less than 10 mPa.s to less than 20 mPa.s

D: Not less than 20 mPa.s

TABLE 3

|  | Ex. | | | | Comp. Ex. | |
| --- | --- | --- | --- | --- | --- | --- |
| Ink composition | 1 | 2 | 3 | 4 | 1 | 2 |
| OD value | B | A | A | A | B | A |
| Rubbing/scratch resistance | A | B | A | A | A | C |

TABLE 3-continued

|  | Ex. | | | | Comp. Ex. | |
| --- | --- | --- | --- | --- | --- | --- |
| Ink composition | 1 | 2 | 3 | 4 | 1 | 2 |
| Anti-clogging property | A | A | A | A | B | A |
| Viscosity | B | A | A | A | C | A |

TABLE 4

|  | Ex. | | | | | |
| --- | --- | --- | --- | --- | --- | --- |
| Ink composition | 5(Y) | 6(N) | 7(LM) | 8(C) | 9(LC) | 10(LC) |
| OD value | A | A | — | A | — | — |
| Rubbing/scratch resistance | A | A | A | A | A | A |
| Anti-Clogging property | A | A | A | A | A | A |
| Viscosity | A | A | A | A | A | A |

What is claimed is:

1. An ink composition comprising: a first colorant; a second colorant; a penetrating agent; water; and a water-soluble organic solvent,
    said first colorant being a pigment which is dispersible and/or dissolvable in water without any dispersant, said second colorant being a pigment dispersion comprising a pigment and a dispersant for dispersing the pigment.

2. The ink composition according to claim 1, wherein the weight ratio of the first colorant to the pigment contained in the second colorant is 1:3 to 7:1.

3. The ink composition according to claim 1 or 2, wherein the first colorant and the pigment contained in the second colorant each have an average particle diameter in the range of 1 to 300 nm.

4. The ink composition according to any one of claims 1 to 3, wherein the total amount of the first colorant and the pigment contained in the second colorant is not more than 15% by weight based on the total amount of the ink composition.

5. The ink composition according to any one of claims 1 to 4, wherein the first colorant has been rendered dispersible and/or dissolvable in water without any dispersant by treating a pigment on its surface so as to bond at least one functional group selected from the group consisting of carbonyl, carboxyl, hydroxyl, and sulfone groups, or a salt thereof, onto the surface of the pigment.

6. The ink composition according to any one of claims 1 to 5, wherein the dispersant contained in the second colorant is a polymeric dispersant or a surfactant.

7. The ink composition according to claim 6, wherein the polymeric dispersant is a water-soluble resin derived from acrylic acid or a polymeric compound containing an anionic group.

8. The ink composition according to claim 7, wherein the water-soluble resin derived from acrylic acid is a resin composed mainly of acrylic acid.

9. The ink composition according to claim 8, wherein the water-soluble resin derived from acrylic acid has a molecular weight in the range of 5,000 to 50,000.

10. The ink composition according to any one of claims 7 to 9, wherein the water-soluble resin derived from acrylic acid is a member selected from the group consisting of block copolymers, graft copolymers, random copolymers, and a mixture of two or more of said copolymers.

11. The ink composition according to any one of claims 1 to 10, wherein the penetrating agent is a glycol ether and/or an acetylene glycol surfactant.

12. The ink composition according to claim 11, wherein the acetylene glycol surfactant is a compound represented by formula (I):

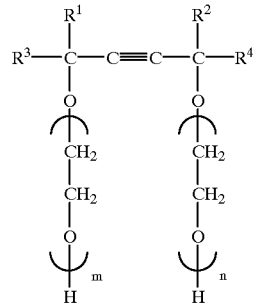

wherein
0≦m+n≦50; and
$R^1$, $R^2$, $R^3$, and $R^4$ each independently represent an alkyl group.

13. The ink composition according to any one of claims 1 to 12, which is used in an ink jet recording method.

14. The ink composition according to claim 13, wherein the ink jet recording method comprises the steps of ejecting droplets of the ink composition and depositing the droplets onto a recording medium to perform printing.

15. A print produced by the recording method according to claim 14.

16. A color ink set comprising two or more ink compositions selected from the group consisting of black ink, yellow ink, magenta ink, and cyan ink compositions,
said ink compositions each being an ink composition according to any one of claims 1 to 12.

17. An ink set comprising a first ink composition and a second ink composition, wherein
said first ink composition and said second ink composition each are an ink composition according to any one of claims 1 to 12, and
when the first ink composition and the second ink composition are printed on a recording medium under identical printing conditions, the OD value of a print produced by printing the first ink composition on the recording medium is higher than the OD value of a print produced by printing the second ink composition on the recording medium.

18. An ink set comprising a first ink composition and a second ink composition, wherein
said first ink composition and said second ink composition each are an ink composition according to any one of claims 1 and 3 to 12, and
when the content of the colorant in the first ink composition is larger than the content of the colorant in the second ink composition, the weight ratio of the first colorant to the pigment contained in the second colorant in the first ink composition is 1 exclusive: 1 to 3:1 while the weight ratio of the first colorant to the pigment contained in the second colorant in the second ink composition is 1:1 exclusive to 1:3.

19. The ink set according to claim 17 or 18, wherein the first ink composition is a yellow ink composition, a magenta ink composition, or a cyan ink composition, while the second ink composition is a light yellow ink composition, a light magenta ink composition, or a light cyan ink composition.

20. The ink set according to any one of claims 16 to 19, which is used in an ink jet recording method.

* * * * *